US009448425B2

(12) United States Patent
Ogawa et al.

(10) Patent No.: US 9,448,425 B2
(45) Date of Patent: Sep. 20, 2016

(54) OPTICAL WAVEGUIDE ELEMENT AND OPTICAL MODULATOR

(71) Applicant: FUJIKURA LTD., Tokyo (JP)

(72) Inventors: Kensuke Ogawa, Sakura (JP); Kazuhiro Goi, Sakura (JP); Hiroyuki Kusaka, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 14/748,331

(22) Filed: Jun. 24, 2015

(65) Prior Publication Data

US 2015/0293384 A1    Oct. 15, 2015

Related U.S. Application Data

(63) Continuation of application No. PCT/JP2013/073828, filed on Sep. 4, 2013.

(30) Foreign Application Priority Data

Dec. 27, 2014    (JP) .................................. 2012-283964

(51) Int. Cl.
*G02F 1/025* (2006.01)
*G02B 6/122* (2006.01)
*G02F 1/015* (2006.01)
(Continued)

(52) U.S. Cl.
CPC ............. *G02F 1/025* (2013.01); *G02B 6/1228* (2013.01); *G02F 1/015* (2013.01); *G02B 2006/12061* (2013.01); *G02B 2006/12097* (2013.01);
(Continued)

(58) Field of Classification Search
CPC .................................. G02F 1/025; G02F 1/015
See application file for complete search history.

(56) References Cited

U.S. PATENT DOCUMENTS 7,085,443 B1    8/2006 Gunn, III et al.
7,941,023 B2 *  5/2011 Patel ...................... G02B 6/122
                                              385/129

(Continued)

FOREIGN PATENT DOCUMENTS

WO        95/08787 A1    3/1995
WO    2013/062096 A1    5/2013

OTHER PUBLICATIONS

Kensuke Ogawa et al., "Silicon Mach-Zehnder modulator of extinction ratio beyond 10 dB at 10.0-12.5 Gbps", Optics Express, Dec. 12, 2011, pp. B26-B31, vol. 19, No. 26.

(Continued)

*Primary Examiner* — Daniel Petkovsek
(74) *Attorney, Agent, or Firm* — Sughrue Mion, PLLC

(57) ABSTRACT

An optical waveguide element includes: a rib waveguide and a pair of slab portions including a first slab portion and a second slab portion connected to both sides of the rib portion so as to sandwich the rib portion. The rib portion has a cross-sectional dimension which allows the propagation of a fundamental mode and a higher order mode in a predetermined single polarization state, and has a first P-type semiconductor and a first N-type semiconductor forming a PN junction, the first slab portion has a second P-type semiconductor and a P-type conductor connected to each other, the second P-type semiconductor is connected to the first P-type semiconductor of the rib portion, the second slab portion has a second N-type semiconductor and an N-type conductor connected to each other, and the second N-type semiconductor is connected to the first N-type semiconductor of the rib portion.

9 Claims, 5 Drawing Sheets

(51) Int. Cl.
 *G02B 6/12* (2006.01)
 *G02F 1/21* (2006.01)
(52) U.S. Cl.
 CPC ........... *G02B2006/12159* (2013.01); *G02F 2001/0152* (2013.01); *G02F 2001/212* (2013.01)

(56) References Cited

U.S. PATENT DOCUMENTS

| | | | |
|---|---|---|---|
| 9,110,348 B2 * | 8/2015 | Goi | G02B 6/122 |
| 9,207,469 B2 * | 12/2015 | Yang | G02F 1/025 |
| 2010/0060970 A1 | 3/2010 | Chen | |
| 2010/0080504 A1 | 4/2010 | Shetrit et al. | |
| 2012/0243828 A1 * | 9/2012 | Suzuki | G02B 6/12007 385/32 |
| 2014/0233878 A1 | 8/2014 | Goi et al. | |

OTHER PUBLICATIONS

Kensuke Ogawa et al., "Low-loss high-speed silicon Mach-Zehnder modulator for optical-fiber telecommunications", Proceedings of SPIE, Mar. 14, 2013, Silicon Photonics VIII, vol. 8629, 86290U-1-86290U-8.

Japanese Office Action for JP 2012-283964 dated Oct. 8, 2013.

* cited by examiner

OPTICAL WAVEGUIDE ELEMENT AND OPTICAL MODULATOR

CROSS REFERENCE TO RELATED APPLICATIONS

This application is a continuation application based on a PCT Patent Application No. PCT/JP2013/073828, filed Sep. 4, 2013, whose priority is claimed on Japanese Patent Application No. 2012-283964 filed Dec. 27, 2012, the entire contents of which are hereby incorporated by reference.

BACKGROUND OF THE INVENTION

1. Field of the Invention

The present invention relates to an optical waveguide element having high speed and low optical loss, and an optical modulator including the optical waveguide element.

2. Description of the Related Art

In recent years, the use of an optical integrated circuit, such as a planar optical waveguide, in a device for optical fiber communication, especially, long-distance wavelength multiplex optical fiber communication, has been considered. PCT International Publication No. WO95/08787 discloses a single-mode silicon rib waveguide which has a PIN junction in a lateral direction and changes the earner density in the PIN junction to control refractive index.

U.S. Pat. No. 7,085,443 describes an optical modulator which is a silicon rib waveguide having a PN diode in a lateral direction, and in which the dopant density of each of P and N regions is uneven and is changed nonlinearly, the dopant density has a maximum value in a portion which is continuous to the electrode of each of the P and N regions, and the dopant density has a minimum value at the center of a waveguide mode.

Kensuke Ogawa, Kazuhiro Goi, Yong Tsong Tan, Tsung-Yang Liow, Xiaoguang Tu, Qing Fang, Guo-Qiang Lo, and Dim-Lee Kwong, "Silicon Mach-Zehnder modulator of extinction ratio beyond 10 dB at 10.0-12.5 Gbps", Optics Express, 2011, Vol 19, No. 26, pp. B26-B31 discloses a high-speed optical modulator of 10 Gbps (gigabits/second) which uses a Mach-Zehnder waveguide having a silicon rib waveguide with a PN diode in a lateral direction as a phase modulation unit, and in which it is reported that an extinction ratio is equal to or greater than 10 dB, and optical loss is equal to or less than 10.5 dB.

An electro-optical element of PCT International Publication No. WO95/08787 uses refractive index control in a single-mode silicon waveguide. However, if a silicon waveguide with the width and thickness of a core of submicron scale is used, optical loss is increased due to optical scattering caused by lateral roughness of the waveguide core, and it is not possible to realize low optical loss, which is required for an optical integrated circuit for long-distance wavelength multiplex optical fiber communication.

Based on the distribution of the dopant density of the PN diode disclosed in U.S. Pat. No. 7,085,443, when expanding the core width in order to reduce optical loss by lateral roughness of the waveguide core, a higher order mode is generated. As a result, if a higher order mode component is superimposed on an intensity modulation signal or a phase modulation signal, an extinction ratio in intensity modulation or a Q value (Q-factor) in phase modulation is decreased, a bit error rate is increased, and an excellent optical communication system is not constructed.

In the silicon Mach-Zehnder waveguide having the PN diode disclosed in Kensuke Ogawa, Kazuhiro Goi, Yong Tsong Tan, Tsung-Yang Liow, Xiaoguang Tu, Qing Fang, Guo-Qiang Lo, and Dim-Lee Kwong, "Silicon Mach-Zehnder modulator of extinction ratio beyond 10 dB at 10.0-12.5 Gbps", Optics Express, 2011, Vol. 19, No. 26, pp. B26-B31, it is difficult to reduce optical loss in a wavelength region including a C band (1530 to 1565 nm) and an L band (1565 to 1625 nm) more than 10 dB. Therefore, it is not possible to realize low optical loss which is required for optical components for long-distance wavelength multiplex optical fiber communication.

From the above, the present invention provides an optical waveguide element which is suitable for an optical integrated circuit, such as an optical modulator having high-speed and low optical loss, and which has a high extinction ratio in intensity modulation or a high Q value in phase modulation in an entire wavelength region for use in long-distance wavelength multiplex optical fiber communication.

SUMMARY OF THE INVENTION

According to a first aspect of the present invention, an optical waveguide element is provided, including: a rib waveguide which includes a core including a rib portion and a pair of slab portions including a first slab portion and a second slab portion connected to both sides of the rib portion so as to sandwich the rib portion, wherein the rib portion includes a cross-sectional dimension which allows the propagation of a fundamental mode and a higher order mode in a predetermined single polarization state, and includes a first P-type semiconductor and a first N-type semiconductor forming a PN junction, the first slab portion includes a second P-type semiconductor and a P-type conductor connected to each other, and the second P-type semiconductor is connected to the first P-type semiconductor of the rib portion, the second slab portion includes a second N-type semiconductor and an N-type conductor, and the second N-type semiconductor is connected to the first N-type semiconductor of the rib portion, the first and second P-type semiconductors are made of a semiconductor material including a P-type dopant, the first and second N-type semiconductors are made of a semiconductor material including an N-type dopant, the P-type conductor is made of a semiconductor material including a P-type dopant in a higher concentration than the first and second P-type semiconductors, is electrically connected to a first electrode, and is arranged in a region where the higher order mode propagates, and the N-type conductor is made of a semiconductor material including an N-type dopant in a higher concentration than the first and second N-type semiconductor, is electrically connected to the second electrode, and is arranged in a region where the higher order mode propagates.

According to a second aspect of the present invention, in the optical waveguide element according to the first aspect, it is preferable that the semiconductor material be silicon.

According to a third aspect of the present invention, it is preferable that the optical waveguide element according to the first or second aspect further include: an upper cladding which is arranged in a surrounding of the core, the first and second electrodes being formed on the upper surface of the upper cladding; and connection conductors which electrically connect the first electrode and the P-type conductor, and the second electrode and the N-type conductor, and pass through the upper cladding.

According to a fourth aspect of the present invention, in the optical waveguide element according to any one of the first to third aspects, it is preferable that the width of the rib portion of the rib waveguide be 500 to 600 nm.

According to a fifth aspect of the present invention, it is preferable that the optical waveguide element according to any one of the first to fourth aspects further include: a rectangular waveguide which includes a rectangular core portion having the same width and thickness as the rib portion; and a connection portion which connects at least one end of the rib waveguide and the rectangular waveguide, and comprises a transition region where the width of each of the pair of slab portions changes from zero in succession.

According to a sixth aspect of the present invention, in the optical waveguide element according to the fifth aspect, it is preferable that the width of each of the pair of slab portions in the transition region change linearly in a propagation direction of light.

According to a seventh aspect of the present invention, in the optical waveguide element according to the fifth aspect, it is preferable that the width of each of the pair of slab portions in the transition region change quadratically in a propagation direction of light.

According to an eighth aspect of the present invention, it is preferable that the optical waveguide element according to any one of the fifth to seventh aspects further include: an inverted tapered waveguide which is connected to an end portion on an opposite side to the connection portion of the rectangular waveguide, and has a narrower width toward the tip thereof.

According to a ninth aspect of the present invention, it is preferable that the optical waveguide element according to any one of the fifth to seventh aspects further include: a Mach-Zehnder waveguide which includes two arm portions between two optical branching parts, and each of the 1×2 optical branching parts be constituted by a multimode interferometer, each of the two arm portions includes the rib waveguide, and the rib waveguides and the 1×2 optical branching parts be connected by the rectangular waveguides.

According to a tenth aspect of the present invention, in the optical waveguide element according to any one of the first to ninth aspects, it is preferable that an inverted tapered waveguide with a narrower width toward the tip be connected to an end portion of a rectangular waveguide in an end portion in which light is incident on the optical waveguide element or light is emitted from the optical waveguide element.

According to an eleventh aspect of the present invention, an optical modulator is provided, including: the optical waveguide element according to any one a the first to tenth aspects, wherein a constant reverse bias voltage is applied to a first electrode connected to the P-type conductor and a second electrode connected to the N-type conductor and an electrical signal only including an AC component is transmitted to either the first electrode or the second electrode to perform optical modulation.

According to the aspects of the present invention, it is possible to provide an optical waveguide element which is suitable for an optical integrated circuit, such as an optical modulator having high-speed and low optical loss, and which has a high extinction ratio in intensity modulation or a high Q value in phase modulation.

DETAILED DESCRIPTION OF THE PREFERRED EMBODIMENTS

Figure 1:
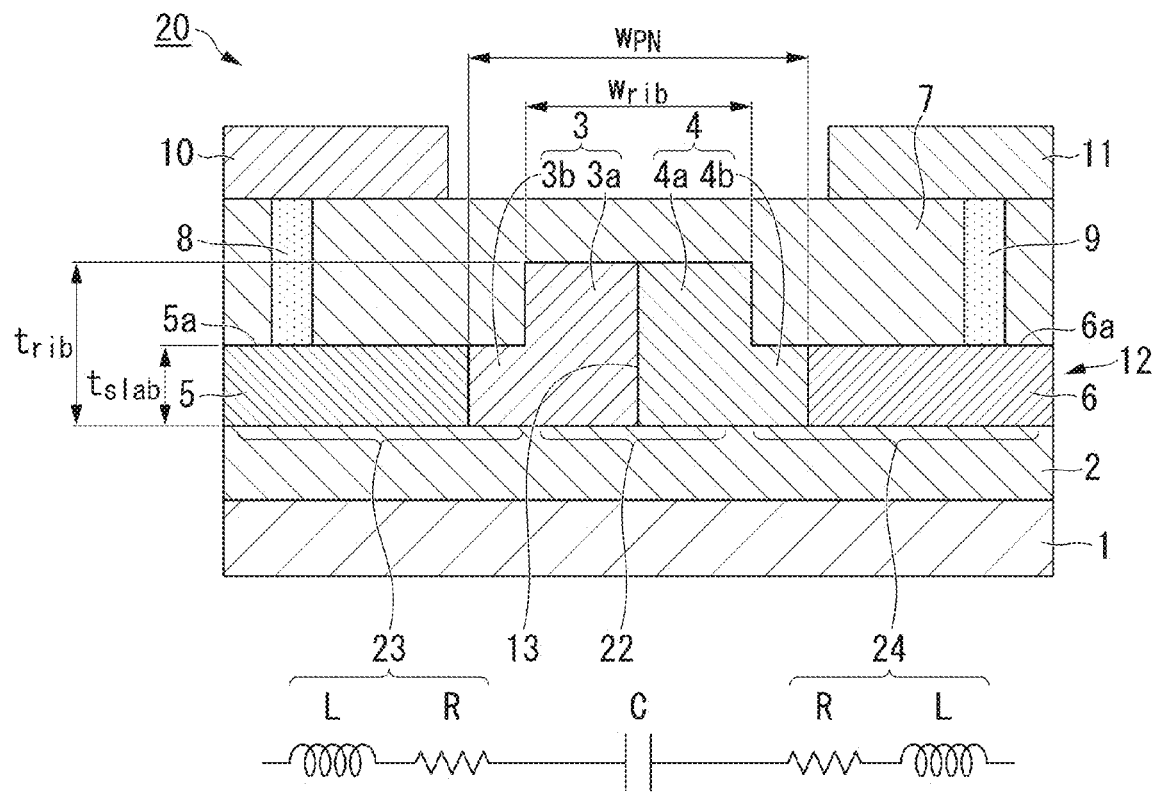
FIG. 1 is a cross-sectional view showing an example of a rib waveguide in an optical waveguide element according to an exemplary embodiment of the present invention.

Hereinafter, the present invention will be described based on a preferred exemplary embodiment referring to the drawings.

FIG. 1 is a schematic view of the cross-sectional structure, of a rib waveguide in an optical waveguide element of the present invention. In the lower portion of FIG. 1, an equivalent circuit between electrodes 10 and 11 is shown.

A core 12 of an optical waveguide has a rib portion 22, and a pair of slab portions 23 and 24 respectively connected to both sides of the rib portion 22. The thickness $t_{rib}$ of the rib portion 22 is greater than the thickness $t_{slab}$ of each of the slab portions 23 and 24. The slab portions 23 and 24 are connected to the sides (both sides) in the lower portion of the rib portion 22, and the lower surface of the rib portion 22 facing a lower cladding 2 is flush with the lower surface of each of the slab portions 23 and 24 facing the lower cladding 2.

In the surrounding of the core 12, an upper cladding 7 and a lower cladding 2 are disposed. The claddings are made of a material having a refractive index lower than that of the core 12. When the core 12 is made of a semiconductor material having a high refractive index, such as silicon (Si), the claddings can be made of silica ($SiO_2$) silicon nitride, or the like. The claddings may be made of an electrical insulation material.

A substrate 1 may be a semiconductor substrate or an insulator substrate, and when an SOI (Silicon-on-insulator) wafer is used, the substrate 1, the lower cladding 2, and the core 12 can be respectively made of a silicon substrate, a buried oxide (BOX) layer, and an SOI layer. In this case, the substrate 1 may be undoped silicon, and silicon of the core 12 is doped as described below.

The lower cladding 2 may have, for example, about 2 µm or a sufficient thickness. The upper cladding 7 can be formed by synthesizing a compound, such as silica ($SiO_2$), and depositing the compound on the rib portion 22 and the slab portions 23 and 24 at a thickness of 1 to 2 μm using a manufacturing method, such as CVD (Chemical Vapor Deposition).

In the core 12, a P-type semiconductor 3 and an N-type semiconductor 4 constituting a PN diode exist. In the boundary between the P-type semiconductor 3 and the N-type semiconductor 4, a PN junction 13 of capacitance C (see an equivalent circuit of FIG. 1) is formed. The P-type semiconductor 3 is made of a semiconductor material containing a P-type dopant, and the N-type semiconductor 4 is made of a semiconductor material containing an N-type dopant.

A P-type conductor 5 is connected to the end portion of the P-type semiconductor 3 opposite to the PN junction 13. Similarly, an N-type conductor 6 is connected to the end portion of the N-type semiconductor 4 opposite to the PN junction 13. The P-type conductor 5 is made of a semiconductor material containing a P-type dopant in a higher concentration than the P-type semiconductor 3, and the N-type conductor 6 is made of a semiconductor material containing an N-type dopant in a higher concentration than the N-type semiconductor 4.

As the semiconductor materials constituting the P-type conductor 5 and the N-type conductor 6, the same semiconductor materials as the P-type semiconductor 3 and the N-type semiconductor 4 are preferably used. For the P-type dopant and the N-type dopant, the same materials are preferably used in the semiconductors and the conductors Examples of the semiconductor material include group IV semiconductors, such as silicon (Si), germanium (Ge), and silicon germanium (SiGe), group III-V semiconductors, such as AlN, GaP, GaAs, and InP, and group II-VI semiconductors, such as ZnO, ZnS, ZnSe, and CdTe. The group IV semiconductors are preferably used, and for example, silicon (Si) can be used.

In the case of the group IV semiconductors, as the P-type dopant, group III elements, such as boron (B), are used. As a method of forming, the P-type semiconductor 3 and the P-type conductor 5, a method of adding the P-type dopant to the semiconductor material layer constituting the core 12 by ion implantation or the like is used.

As the N-type dopant of the group IV semiconductors, group V elements, such as phosphorus (P) and arsenic (As), are used. As a method of forming the N-type semiconductor 4 and the N-type conductor 6, a method of adding the N-type dopant to the semiconductor material layer constituting the core 12 by ion implantation or the like is used.

The rib portion 22 has a P-type semiconductor 3a and an N-type semiconductor 4a, and the P-type semiconductor 3a and the N-type semiconductor 4a in the rib portion 22 form the PN junction 13.

A first slab portion 23 which is one of a pair of slab portions has a P-type semiconductor 3b and a P-type conductor 5 connected to each other, and the P-type semiconductor 3b of the first slab portion 23 and the P-type semiconductor 3a of the rib portion 22 are connected to each other to form an integrated P-type semiconductor 3.

A second slab portion 24 which is the other slab portion of a pair of slab portions has an N-type semiconductor 4b and an N-type conductor 6 connected to each other, and the N-type semiconductor 4b of the second slab portion 24 and the N-type semiconductor 4a of the rib portion 22 are connected to each other to form an integrated N-type semiconductor 4.

The P-type conductor 5 and the N-type conductor 6 are respectively electrically connected to electrodes 10 and 11 in order to apply a voltage to the P-type semiconductor 3 and the N-type semiconductor 4 constituting the PN diode.

In the example shown in FIG. 1, the electrodes 10 and 11 are formed on the upper surface of the upper cladding 7 which covers the upper portions of the rib portion 22 and the slab portions 23 and 24 (that is, the core 12). The electrodes 10 and 11 are electrically connected to the P-type conductor 5 and the N-type conductor 6 by connection conductors 8 and 9 which pass through the upper cladding 7.

The connection conductors 8 and 9 and the electrodes 10 and 11 can be formed by depositing a conductor, such as a metal, using plating, vapor deposition, or the like. For example, the connection conductors 8 and 9 are formed by filling openings formed in the upper cladding 7 using photolithography or the like with a conductor, and the electrodes 10 and 11 are formed by laminating a conductor on the upper surface of the upper cladding 7.

In the example shown in FIG. 1, the connection conductors 8 and 9 and the electrodes 10 and 11 are connected to upper surfaces 5a and 6a of the P-type conductor 5 and the N-type conductor 6.

A constant reverse bias voltage is applied between the electrode 10 connected to the P-type conductor 5 and the electrode 11 connected to the N-type conductor 6, and an electrical signal including only an AC component is transmitted to either electrode, thereby performing optical modulation. An electrical signal for use in modulation preferably includes only an AC component oscillating to positive and negative, without including a DC component. As the electrical signal, a high-frequency signal of for example, 1 GHz to 20 GHz is preferably used for a high-speed operation.

The P-type conductor 5 and the N-type conductor 6 are doped in a high concentration in order to reduce electrical resistance which adversely affects the high-speed operation. For example, while the dopant concentration in the P-type semiconductor 3 and the N-type semiconductor 4 is about $10^{18}$ cm$^{-3}$, the dopant concentration in the P-type conductor 5 and the N-type conductor 6 is about $10^{20}$ cm$^{-3}$. The P-type conductor 5 and the N-type conductor 6 have electrical resistance R and inductance L of the substantially same values (see the equivalent circuit of FIG. 1).

As described above, in the waveguide using the semiconductor material, such as silicon, for example, light scattering due to lateral roughness of the waveguide core when forming a waveguide pattern using photolithography significantly affects optical loss of the waveguide. In order to reduce optical loss due to lateral roughness, it is desirable that the position of the core lateral is separated from the center of a fundamental mode of the waveguide by widening the core width.

In the case of a rib waveguide, the rib portion 22 is a principal portion of the core 12 which allows the propagation of the fundamental mode. For this reason, if the width $w_{rib}$ of the rib portion 22 is wide, optical loss of the waveguide can be reduced. For example, it is preferable that the rib width $w_{rib}$ be 500 to 600 nm.

Table 1 shows optical loss with respect to the rib width of the rib waveguide having the silicon core.

TABLE 1

| Rib width | 400 nm | 500 nm | 600 nm |
|---|---|---|---|
| Light loss in C band | 1.07 ± 0.15 dB/cm | 0.74 ± 0.32 dB/cm | 0.57 ± 0.24 dB/cm |
| Light loss in L band | 0.84 ± 0.14 dB/cm | 0.71 ± 32 dB/cm | 0.55 ± 0.25 dB/cm |

However, if the rib width $w_{rib}$ is widened, a higher order mode more strongly localizes in the rib portion 22 of the waveguide core. That is, the rib portion 22 has a cross-sectional dimension such that a fundamental mode and a higher order mode in a specific polarization state propagate therethrough. In a planar optical waveguide, there are a TE component horizontal to the substrate 1, the slab portions 23 and 24, and the like, and a TM component vertical to the substrate 1, the slab portions 23 and 24, and the like. In general, the TE component contributes to waveguide, and the waveguide mode of the TM component does not contribute to waveguide. This is because an effective refractive index of the fundamental mode of the TM component is lower than an effective refractive index of the higher order mode (for example, N=2) of the TE component.

Figure 5:
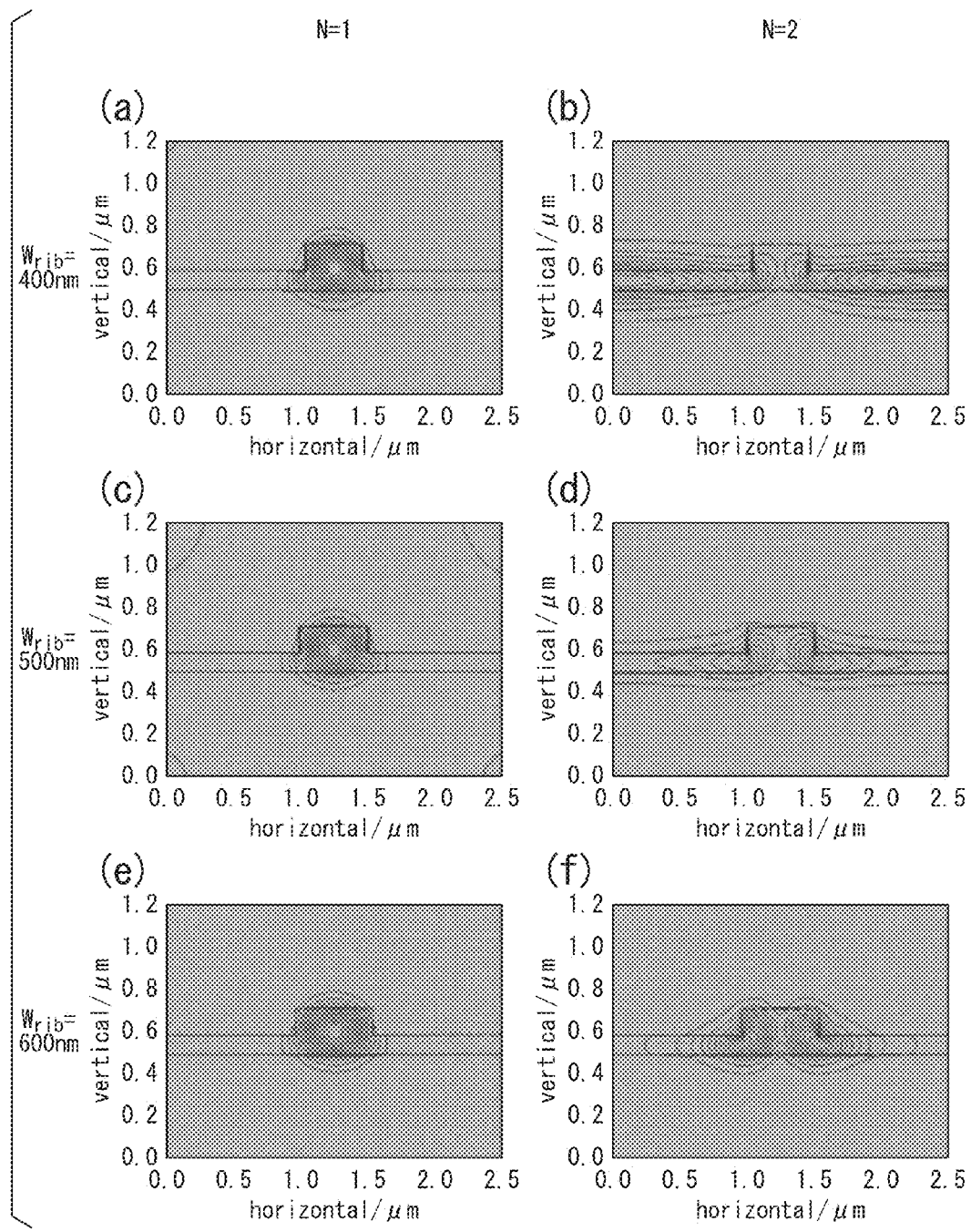
FIG. 5 is a diagram showing an example of a result of mode calculation of a fundamental mode (N=1) and a higher order mode (N=2) with respect to the width of a rib portion.

As an example, FIG. 5 shows a result of mode calculation (intensity distribution profile) of a fundamental mode (N=1) and a higher order mode (N=2) with respect to several rib widths. A wavelength is 1550 nm, and polarization is a TE component. The refractive index of silicon in the core is 3.5, the refractive index of silica in the cladding is 1.45, the thickness $t_{rib}$ of the rib portion from the core bottom surface is 220 nm, and the thickness $t_{slab}$ of the slab portion on the side is 95 nm.

At the rib width of 400 nm, the higher order mode of N=2 localizes on the slab side. Therefore, although the rib waveguide is a single-mode waveguide, it is understood from Table 1 that optical loss is high. When the rib width is greater, optical loss is smaller; however, a higher order mode tends to localize at the rib center. When the rib width is increased to a maximum of 700 nm and the same mode calculation is executed, it has been confirmed that a mode of a TE component of a higher order than N=2 does not propagate through the rib waveguide.

Hereinafter, the "fundamental mode" indicates an N=1 mode of a TE component, and the term "higher order mode" indicates an N=2 mode of a TE component.

Accordingly, in the optical waveguide element of the present exemplary embodiment, in order to avoid degradation of an extinction ratio, a Q value, and the like by propagation of a higher order mode, a member which attenuates a higher order mode without attenuating a fundamental mode is disposed. With this, it is possible to constitute an optical waveguide which is a multimode waveguide allowing the propagation of a higher order mode and substantially functions as a single-mode waveguide with the dimension of the core cross-section.

Specifically, the P-type conductor 5 and the N-type conductor 6 are disposed in the slab portions 23 and 24. In the related art, in order to enhance electrical connection of the slab portions and the electrodes, there is a case where a region having a high dopant concentration is disposed around the connection portions of the slab portions and the electrodes for example, see U.S. Pat. No. 7,085,443). In the present invention, the forming range of the P-type conductor 5 and the N-type conductor 6 extends near the rib portion 22, and is disposed in a region where a higher order mode propagates.

In the P-type conductor 5 and the N-type conductor 6, holes and electrodes are distributed as carriers with a high density. Therefore, light is attenuated by free carrier absorption. It is known that an optical absorption coefficient by free carrier absorption is increased in proportion to the carrier density.

As described above, since the higher order mode spreads to the slab portions 23 and 24, attenuation in the P-type conductor 5 and the N-type conductor 6 occurs strongly with respect to the higher order mode. With this, it is possible to selectively attenuate the higher order mode. Accordingly, the rib waveguide according to the present invention can reduce the influence of optical loss by lateral roughness by widening the rib width and transmission loss as a single-mode waveguide, which allows the propagation of only the fundamental mode, can be realized. Therefore, it is possible to avoid deterioration of characteristics in modulation (for example, degradation of an extinction ratio in intensity modulation, degradation of a Q value in phase modulation, or the like).

Free carrier absorption causes a change in a refractive index. This is generally a phenomenon which is called plasma dispersion or the like. In an optical modulator using a silicon waveguide, the carrier density can be changed by a high-frequency electrical signal using plasma dispersion, and an effective refractive index of the waveguide can be modulated at high speed.

In the optical waveguide element of the present exemplary embodiment, if a high-frequency signal is applied, the carrier density is changed around the PN junction 13 located in the rib portion 22 of the waveguide core 12. With this, it is possible to modulate an effective refractive index of the waveguide at high speed. Since the electrical resistance R of the P-type conductor 5 and the N-type conductor 6 is small, and a voltage drop in the P-type conductor 5 and the N-type conductor 6 is small, a change in the carrier density in the P-type conductor 5 and the N-type conductor 6 is negligible. Accordingly, it is possible to attenuate the higher order mode without temporal fluctuations even when a high-frequency electrical signal is applied.

It is possible to optimize the interval $w_{PN}$ between the P-type conductor 5 and the N-type conductor 6 according to the rib width $w_{rib}$. For example, the interval $w_{PN}$ is adjusted such that optical loss becomes as small as possible, and characteristics in modulation (for example, an extinction ratio in intensity modulation, a Q value in phase modulation, or the like) are improved as much as possible One procedure is illustrated, in which an intensity modulator or a phase modulator is constituted to adjust the interval $w_{PN}$ such that factors $I_{ER}/I_{loss}$, and $I_{ER}/I_Q$ are maximized thereby optimizing the interval $w_{PN}$. The $I_{ER}$, $I_{loss}$, and $I_Q$ respectively represent an extinction ratio, a Q value, and optical loss in terms of dB.

As a specific example, the interval $w_{PN}$ between the P-type conductor 5 and the N-type conductor 6 can be set to 2 μm (2000 nm) with respect to the rib width $w_{rib}$ of 500 to 600 nm. For example, the interval $w_{PN}$ may be set to about two or five times the rib width $w_{rib}$. The middle point of the interval $w_{PN}$ in the rib width direction (lateral direction) exists substantially at the center of the rib portion 22. In order to suppress the pumping of the higher order mode, preferably, the PN junction 13 exists substantially at the center of the rib portion 22. This is because the electric field profile of the higher order mode is asymmetric in the lateral direction, and thus, when the position of the PN junction 13 is deviated from the center of the rib portion 22 and is asymmetric in the lateral direction, the higher order mode is easily pumped.

In the example of FIG. 1, the PN junction 13 is formed substantially vertically from the bottom surface of the core. Although it is considered to make the PN junction inclined with respect to the bottom surface of the core, or parallel to the bottom surface of the core, it is desirable that a lateral PN diode is constituted as shown in FIG. 1.

In order to suppress the pumping, of the higher order mode, preferably, the distribution of the doping density (dopant concentration) of the P-type conductor 5 and the N-type conductor 6 is substantially even. This is because, if the doping density is uneven, when a high-speed electrical signal is applied, the higher order mode is pumped by intensity modulation in the slab portions 23 and 24, resulting in deterioration of characteristics, such as an extinction ratio, a Q value, and the like.

When manufacturing a waveguide, since there is misalignment due to restriction of manufacturing accuracy, there is an error of ±10 nm order. In the thickness control of each layer, there is an error of ±tens of nm order. In order to evaluate the characteristics of the waveguide, it is desirable that a plurality of waveguides having the same specification is prepared, and an average value and a standard deviation are obtained. In the description of this specification, although description of errors as regards the dimension and characteristics of the waveguide is omitted, it is desirable to consider errors, such as a manufacturing error.

For example, when "the PN junction exists at the center of the rib portion in the lateral direction", this means that there is a manufacturing error in the position of the PN junction or each of both laterals of the rib portion, and there is also an error in the addition range of the dopant of the P-type semiconductor and the N-type semiconductor. Since there is also roughness on both laterals of the rib portion, it is desirable that a condition is satisfied to the same degree as an error, for example, within a range of about one time to three times the error in an average position based on a reference, such as a predetermined section in a longitudinal direction. Regarding "the middle point of $w_{PN}$ exists at the center of the rib portion in the lateral direction", there is an error in each of the positions of the boundary between either of the P-type and N-type conductor, which become both ends of $w_{PN}$, and the semiconductor, and the positions of both laterals of the rib portion, and it is desirable to take the error into consideration similarly.

(Calculation Example of Electric Field Profile)

FIGS. 6 to 9 show an example of a result of the electric field profile of a silicon waveguide obtained by mode calculation.

Figure 6:
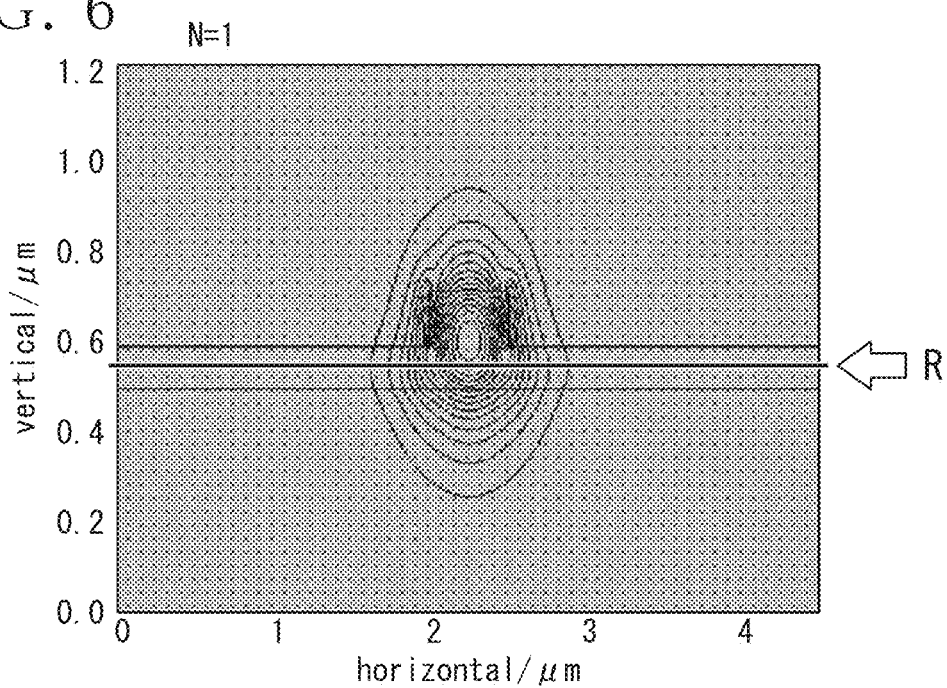
FIG. 6 is a diagram showing an example of a mode electric-field distribution of a fundamental mode (N=1).
Figure 7:
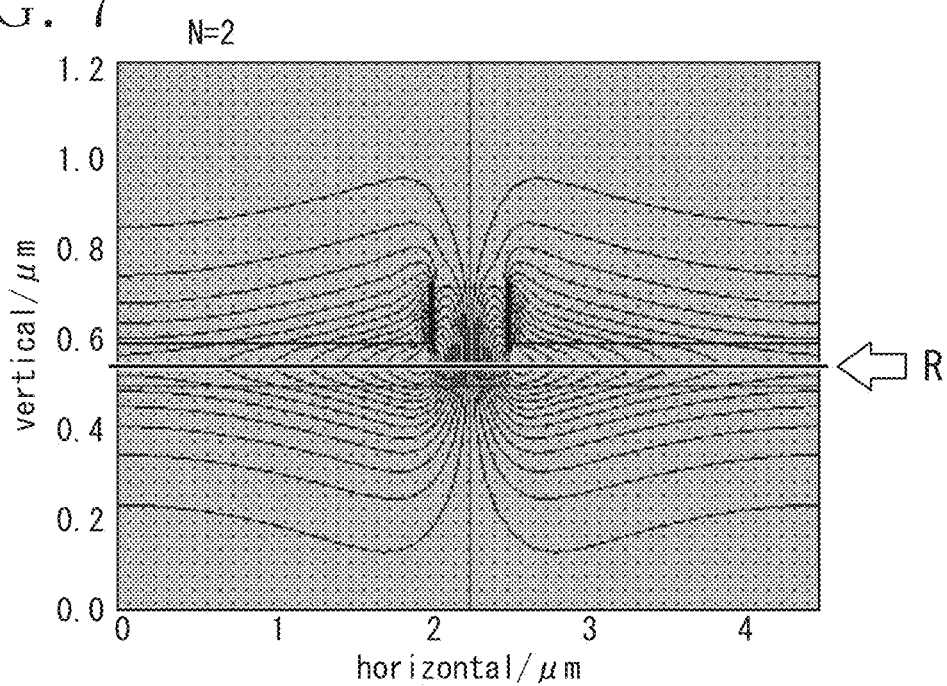
FIG. 7 is a diagram showing an example of a mode electric-field distribution of a higher order mode (N=2).
Figure 8:
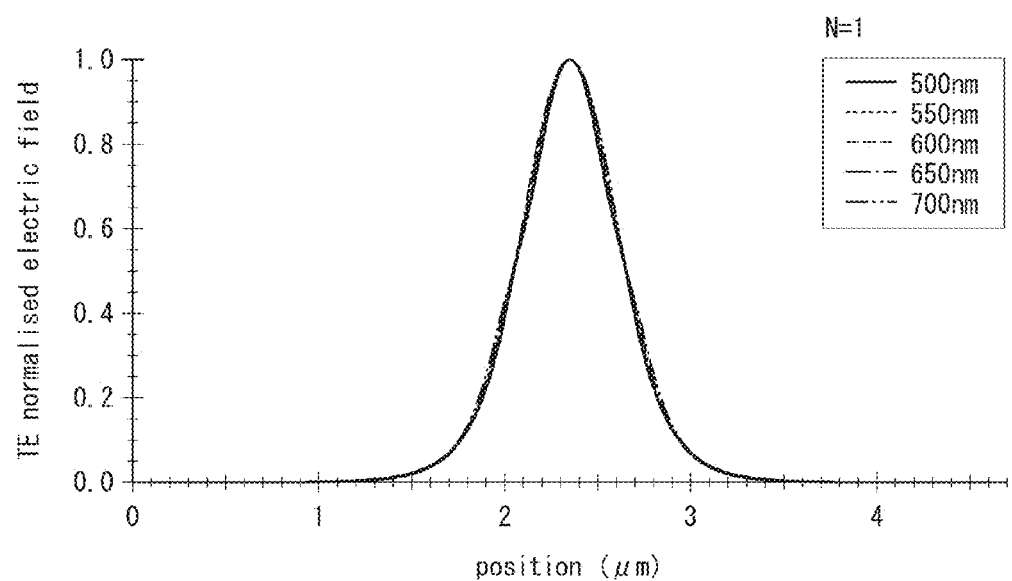
FIG. 8 is a graph showing an example of an electric field profile of a fundamental mode (N=1) along a surface indicated by an arrow R of FIG. 6.
Figure 9:
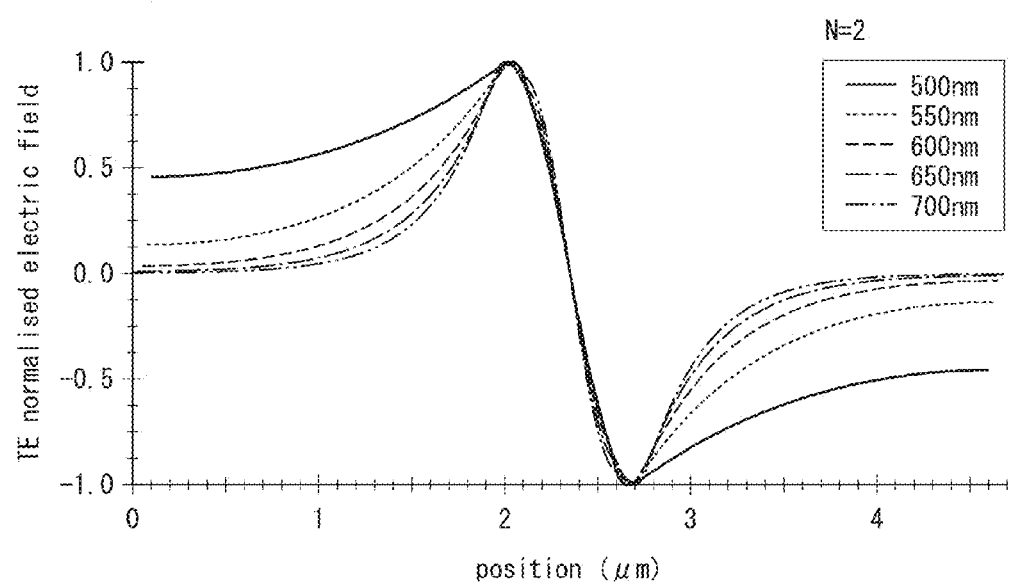
FIG. 9 is a graph showing an example of an electric field profile of a higher order mode (N=2) along a surface indicated by an arrow R of FIG. 7.

In the case of the silicon waveguide, the core is Si, and the cladding is $SiO_2$. The refractive indexes of the materials of the core and the cladding are respectively 3.5 and 1.45. In this case, the refractive index difference between the core and the cladding is great, and contrast is high. FIGS. 6 and 7 show the distribution of a mode electric field of a fundamental mode (N=1) and a higher order mode (N=2) when $w_{rib}$=500 nm using a contour line. FIGS. 8 and 9 show an electric field profile along the horizontal line of a substantially intermediate height (indicated by an arrow R on the contour line of FIGS. 6 and 7) in the thickness direction of the slab portion. The horizontal axis represents the position on the waveguide, and the vertical axis represents an electric field standardized by a maximum value of the electric field of each profile. FIGS. 8 and 9 show electric field profiles when $w_{rib}$=500 nm, 550 nm, 600 nm, 650 nm, 700 nm in an overlapping manner.

In the fundamental mode (FIG. 8), the electric field profile does not almost change with respect to different $w_{rib}$. In the higher order mode (FIG. 9), the electric field profile significantly changes, and tends to localize strongly at the rib center when $w_{rib}$ is widened. A center point in the horizontal direction of the rib is located at 2.35 μm on the horizontal axis. In order to make the effect of higher order mode attenuation more eminent, $w_{PN}$ needs to be narrowed when $w_{rib}$ is widened. In order to keep the intensity attenuation of the fundamental mode to be equal to or less than 1%, the minimum value of $w_{PN}$ is 1500 nm when $w_{rib}$=500 nm and is 2000 nm when $w_{rib}$=600 nm. In order to avoid a decrease in an operation speed with an increase in series resistance to the PN junction, it is desirable that $w_{PN}$ is equal to or less than 2500 nm. When $w_{rib}$=600 nm, the effect of higher order mode attenuation is obtained even if $w_{PN}$ is wider than 2500 nm; however, the minimum value of $w_{PN}$ may be 2000 nm in consideration of improvement of a high-speed operation. If $w_{rib}$ is wide, intensity attenuation of the fundamental mode is easily suppressed. When $w_{rib}$ is from 500 to 600 nm, it can be approximated that the minimum value of $w_{rib}$ changes linearly.

For comparison, the same calculation has been performed in the case of a compound semiconductor waveguide. In an InGaAsP/InP-based compound semiconductor material, a combination in which a core is $In_{1-x}Ga_xAs_yP_{1-y}$ (where x=0.33, y=0.72), and a cladding is InP is possible. In this combination, since there is no lattice mismatching between the core and the cladding and the influence of distortion can be eliminated, if the cladding thickness is set to be equal to or greater than 500 nm, the confinement of guided light to the core can be secured. The refractive indexes of the materials of the core and the cladding are respectively 3.45 and 3.18. A refractive index contrast is low compared to an Si-based or $SiO_2$-based compound semiconductor. Since the refractive index contrast is low compared to a silicon-based compound semiconductor, the intensity center of the higher order mode tends to localize on the slab side to about $w_{rib}$=1100 nm. Accordingly, the higher order mode does not become a propagation mode and it is not necessary to attenuate the higher order mode. If $w_{rib}$ is wider than 1100 nm, the intensity center of the higher order mode localizes in the rib, and the higher order mode becomes a propagation mode. However, since the intensity center of the higher order mode localizes strongly in the rib, the influence of intensity attenuation in a highly doped region of the lateral slab is very small and is not effective. The dimension other than $w_{rib}$ is the same as in the silicon waveguide. The same result is obtained even in a GaAs-based or GaAlAs-based compound semiconductor.

Accordingly, in the optical waveguide element of the present exemplary embodiment, the effect of performance improvement by higher order mode attenuation is remarkable for a high refractive index contrast waveguide. In particular, it is effective for a silicon-based waveguide (Si core and $SiO_2$ cladding). Similarly, it is considered that this embodiment is effective for a waveguide in which the refractive index difference (or refractive index ratio) between a core and a cladding is great.

(Optical Modulator)

An optical waveguide which is usable in a high-speed intensity modulator or phase modulator of 10 Gbps or greater will be described in detail. Like the equivalent circuit of FIG. 1, since the rib waveguide electrically becomes an LRC series resonant circuit, it is necessary to avoid deterioration of high-speed performance due to LRC resonance. Therefore, a constant reverse bias voltage is applied to the PN junction and capacitance C is reduced to increase an LRC resonant frequency, whereby a high-speed operation can be implemented. For example, if a given reverse bias of about 1 V or higher is applied, the LRC resonant frequency can be increased to about 20 GHz or higher. If the reverse bias is set to about 5 V, the LRC resonant frequency can be increased to about 35 GHz or higher, and the LRC series resonant circuit can be used as a phase modulator of digital coherent transmission of 100 Gpbs. Simultaneously, since capacitance is reduced, a low impedance state where impedance is equal to or less than 40Ω at the time of a zero bias is eliminated, whereby the impedance of the waveguide can be increased to 50Ω or greater. With this, impedance matching of a high-speed electric circuit having impedance of normal 50Ω and a waveguide is possible.

When the waveguide length is equal to or greater than 3 mm, if a high-speed electrical signal (output power 500 mW to 750 mW) including only an AC component is transmitted along one of the electrode connected to the P-type conductor and the electrode connected to the N-type conductor from an electrical signal generator (the other electrode is grounded) having output impedance of 50Ω, phase modulation amplitude can be set to be equal to or greater than π, and intensity modulation of a high extinction ratio or phase modulation of a high Q value is possible. The output power of the high-speed electrical signal is adjusted according to the wavelength. In order to avoid an increase in optical loss or deterioration of the waveform of the high-speed electrical signal, it is preferable that the waveguide length be about 6 mm or less.

As described above, in order to reduce optical loss, the rib width $w_{rib}$ needs to be set to 500 nm or greater. If $w_{rib}$, exceeds 600 nm, since the higher order mode localizes more strongly in the rib portion, the attenuation of the higher order mode in the P-type conductor and the N-type conductor is insufficient, and the extinction ratio or the Q value is decreased Therefore, it is preferable that the rib width $w_{rib}$ be substantially to 500 to 600 nm or greater.

(Rectangular Waveguide)

Figure 2:
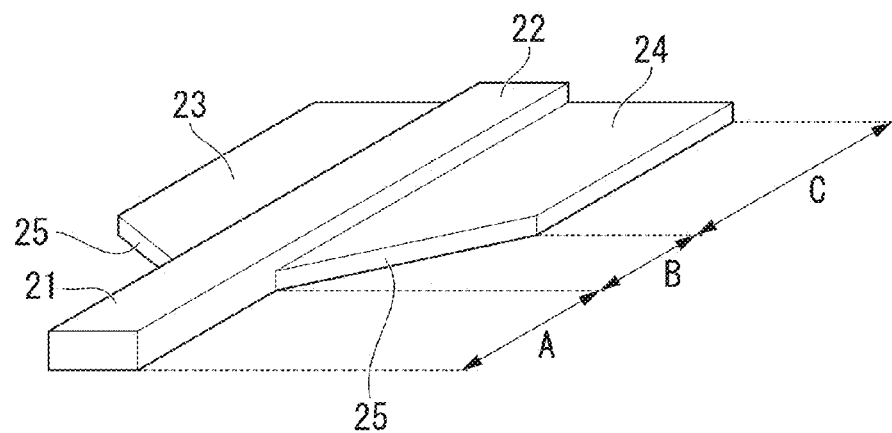
FIG. 2 is a perspective view showing an example of a transition region between a rectangular waveguide and a rib waveguide according to the exemplary embodiment of the present invention.

In order to constitute an optical integrated circuit, such as an optical modulator, using the rib waveguide shown in FIG. 1, it is preferable that the rib waveguide be connected to a rectangular waveguide. FIG. 2 is a schematic perspective view of a rib waveguide connected to a rectangular waveguide. A rectangular waveguide 21 (A of FIG. 2) shown in FIG. 2 has the same width and thickness (see $w_{rib}$ and $t_{rib}$ of FIG. 1) as the rib portion 22 of the rib waveguide (C of FIG. 2). In a transition region (B of FIG. 2) from the rectangular waveguide to the rib waveguide, the transition region includes a portion 25 in which the width of each of the slab portions 23 and 24 changes from zero in succession. In the transition region, it is preferable that the width of each of a pair of slab portions 23 and 24 change linearly or quadratically in a propagation direction of light. When the width of each of a pair of slab portions 23 and 24 changes linearly, design is facilitated. In order to further reduce optical loss, it is preferable that the width of each of the slab portions 23 and 24 change quadratically.

It is preferable that the length of the transition region B be sufficiently longer than the wavelength of light. The length of the transition region B is not particularly limited, and is, for example, about 20 μm.

Similarly to the rib waveguide, in order to reduce optical loss due to lateral roughness, it is preferable that the rectangular waveguide has a cross-sectional dimension capable of allowing the propagation of the higher order mode. Accordingly, the width of the rectangular waveguide is set to be the same as the rib width. Therefore, the higher order mode propagates even through the rectangular waveguide; however, the higher order mode propagating the rectangular waveguide can be attenuated in the rib waveguide by the above-described principle. With this, it is possible to constitute an optical integrated circuit which has lower loss than an optical integrated circuit constituted by a single-mode waveguide and has performance equivalent to an optical integrated circuit constituted by a single-mode waveguide in the functions, such as the extinction ratio.

The rectangular waveguide can be connected to an inverted tapered waveguide whose width is gradually narrowed toward the end surface (or the tip). In this case, the wide end portion of the inverted tapered waveguide is connected to the rectangular waveguide, and the width of the inverted tapered waveguide is narrowed from the side connected to the rectangular waveguide toward the tip. In the end portion where the inverted tapered waveguide is connected to the rectangular waveguide, the widths of both waveguides may match each other. When optically coupling a waveguide on a substrate to an optical fiber, the narrow tip of the inverted tapered waveguide is arranged toward the optical fiber. The counterpart of optical coupling is not limited to the optical fiber, and when optically coupling a waveguide of a silicon core having a small mode field diameter (MFD) to another waveguide, such as an optical fiber having a large mode field diameter, it is preferable that an inverted tapered waveguide be disposed at the tip of the silicon waveguide. The rectangular waveguide or the inverted tapered waveguide can be constituted by a semiconductor material, such as silicon, like the rib waveguide. In the rectangular waveguide or the inverted tapered waveguide, P-type or N-type dope may not be applied.

If the inverted tapered waveguide is used, when optically coupling the optical fiber and the rectangular waveguide, it is possible to reduce mode mismatching between the end surfaces of both of the optical fiber and the rectangular waveguide and to reduce loss in optical coupling. If mode mismatching is reduced, the generation of the higher order mode can be reduced, but cannot be completely removed. When constituting an optical integrated circuit, mode mismatching mostly causes the generation of the higher order mode. The rib waveguide of the present exemplary embodiment is effective for attenuating the higher order mode.

The inverted tapered waveguide is an example of a structure of spot size conversion in which the core size is gradually narrowed to expand the mode field. Since the direction of expanding the size of the core is reverse to the direction of expanding the size of the mode field, this type is called an "inverted tapered type".

Since the thickness of the rib waveguide and the rectangular waveguide is a submicron scale, the tip portion of the inverted tapered waveguide has minute width and end surface. Accordingly, near the end swine of the inverted tapered waveguide, it is possible to suppress reflectance of light incident on the cross-sectional area of a high refractive index core on the end surface of the inverted tapered waveguide to about −30 dB. As a result, an optical integrated circuit having high return loss (small reflection loss) as well as low optical loss and a high extinction ratio can be constituted.

(Mach-Zehnder Waveguide)

Figure 3A:
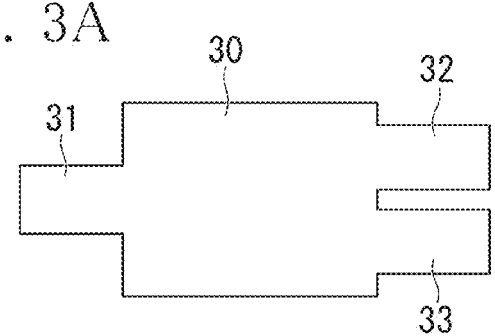
FIG. 3A is a plan view showing an example of a 1×2 optical branching part constituted by a multimode interferometer according to the exemplary embodiment of the present invention.
Figure 3B:
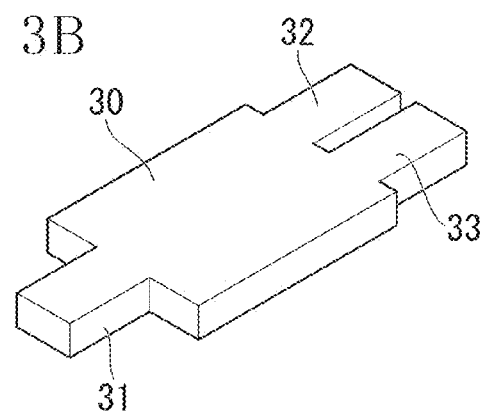
FIG. 3B is a perspective view showing an example of a 1×2 optical branching part constituted by a multimode interferometer according to the exemplary embodiment of the present invention.

The optical waveguide element of the present exemplary embodiment may constitute a Mach-Zehnder waveguide using a 1×2 multimode interferometer (MMI) as an optical branching and coupler section. FIGS. 3A and 3B are schematic views of the 1×2 MMI. FIG. 3A is a plan view, and FIG. 3B is a perspective view. One rectangular waveguide (reference numeral 31) is connected to one side of an MMI 30, and two rectangular waveguides 32, and 33 are connected to the opposite side. It is preferable that the width of each of the rectangular waveguides 31, 32, and 33 be the same as the rib width of the rib waveguide. A specific example where, when the rib width is 600 nm, the width of each of the rectangular waveguides 31, 32, and 33 is 600 nm, the interval of the rectangular waveguides 32 and 33 is 300 nm, the width of the MMI is 1700 nm and the length of the MMI is 2400 nm is illustrated. In this case, the interval secured between each of the rectangular waveguides 32 and 33 to the long side of the MMI 30 based on calculation is 100 nm.

The 1×2 MMI has an advantage in that optical loss can be reduced compared to a Y-shaped optical branching and coupler section; while the extinction ratio is decreased since the higher order mode becomes the propagation mode, not a radiation mode. In the optical waveguide element of the present exemplary embodiment, the higher order mode incident, on the 1×2 MMI can be removed by the rib optical waveguide, the decrease in the extinction ratio is eliminated.

Figure 4:
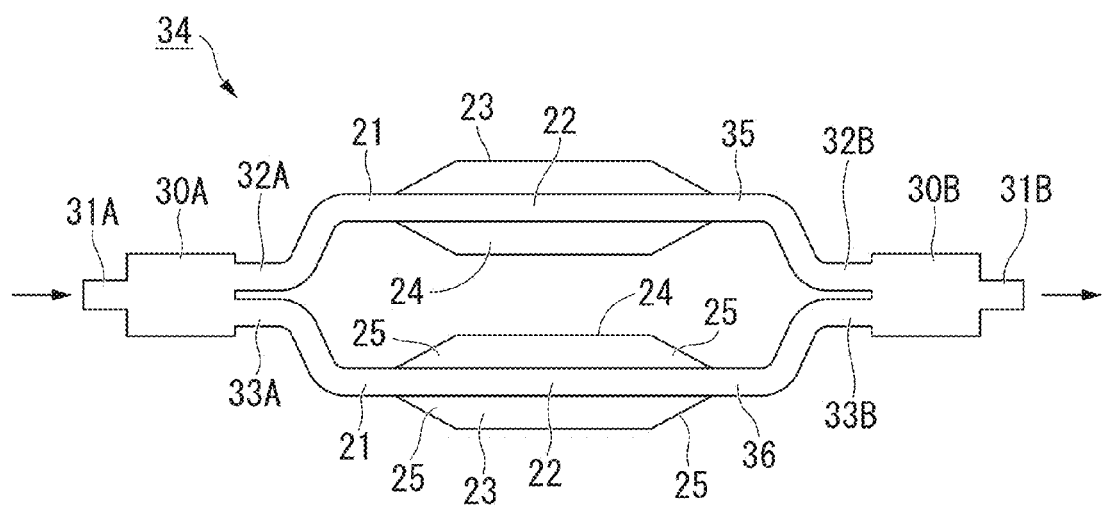
FIG. 4 is a plan view showing an example of a Mach-Zehnder waveguide according to the exemplary embodiment of the present invention.

FIG. 4 is a schematic view of a Mach-Zehnder waveguide, A Mach-Zehnder waveguide 34 is a rib waveguide which is disposed with two arm portions 35 and 36 between two MMIs 30A and 30B, and each of the arm portions 35 and 36 has a P-type conductor 5 and an N-type conductor 6 (see FIG. 1) in the slab portions 23 and 24 shown in FIG. 1. Each of the arm portions 35 and 36 and each of waveguides 32A, 33A, 32B, and 33B on the branching sides of the MMIs 30A and 30B is connected by a rectangular waveguide 21 having the same width as the rib portion 22. At the tip of each of the waveguide 31A on the incidence side of the MMI 30A and the waveguide 31B on the emission side of the MMI 30B, the above-described inverted tapered waveguide (not shown) may be disposed.

Light incident on the MMI 30A from the left waveguide 31A is branched into the right two waveguides 32A and 33A, and propagates through the arm portions 35 and 36 of the Mach-Zehnder waveguide 34. A higher order mode generated by the inverted tapered waveguide, the MMI, or the like is attenuated while propagating through the arm portions 35 and 36 and disappears. Only a fundamental mode can be incident on the MMI 30B on the combining side from both arm portions 35 and 36 from the left. Accordingly, if a high-speed electrical signal is input to the rib waveguide, signal light subjected to optical modulation with a high extinction ratio is output from the right waveguide 31B of the MMI 30B on the multiplexing side. With this, it is possible to constitute a Mach-Zehnder waveguide suitable for optical modulator with low optical loss and a high extinction ratio. If the Mach-Zehnder waveguide is used, it is possible to control the chirp of an optical signal, and to constitute a high-speed optical modulator suitable for long-haul transmission.

Although the present invention has been described based on the preferred exemplary embodiment, the present invention is not limited to the above-described embodiment, and various alteration or modifications can be made without departing from the spirit and scope of the present invention.

For example, an optical modulator using the Mach-Zehnder waveguide is an example of an optical integrated circuit using the optical waveguide element of the present invention. It is possible to constitute an optical integrated circuit, such as a multiport optical switch, by connecting Mach-Zehnder waveguides in multiple stages, by disposing a plurality of Mach-Zehnder waveguides in parallel, or by using a 1×N (where N is three or more) optical branching and coupler section (for example, an MMI).

In the Mach-Zehnder waveguide, the directions (polarities) of disposing the P-type conductor and the N-type conductor in the rib waveguides of both arm portions are not particularly limited, and any of the following may be applied.

(1) P type-rib portion—N type—space between arms—P type-rib portion—N type (2) P type-rib portion—N type—space between arms—N type-rib portion—P type
(3) N type-rib portion P type—space between arms—P type-rib portion—N type
(4) N type-rib portion—P type—space between arms—N type-rib portion—P type When connecting the P-type and N-type conductors and the electrodes, the lateral surfaces or lower surfaces of the P-type conductor and the N-type conductor may be connected to the electrodes.

A light source or a light receiver may be disposed in the plane of the substrate of the optical integrated circuit, and may be connected to a waveguide having the rib waveguide of the present invention.

It is preferable that, in addition to the end portion of the rectangular waveguide 21 of FIG. 2 or each of the waveguides 31A and 31B of FIG. 4, an inverted tapered waveguide having a narrower width toward the tip be connected to an end portion in which light is incident on the optical waveguide element or light is emitted from the optical waveguide element.

EXAMPLES

Hereinafter, the present invention will be specifically described based on examples.

In the configuration shown in FIG. 1, an SOI wafer was used as the material for the substrate 1, the lower cladding 2, and the core 12. A BOX layer made of silica having a thickness of 2 μm was formed as the lower cladding 2, and a P-type or N-type dopant was added to an overlying SOI layer made of silicon by ion implantation to form the P-type semiconductor 3, the N-type semiconductor 4, the P-type conductor 5, and the N-type conductor 6. A part of the core 12 was removed by etching to form the rib portion 22 and the slab portions 23 and 24. The rib width $w_{rib}$ was 500 to 600 nm, the rib thickness $t_{rib}$ was 220 nm, the slab thickness $t_{slab}$ was 95 nm, and the interval $w_{PN}$ of the P-type conductor 5 and the N-type conductor 6 was about 2 μm. The upper cladding 7 made of silica was deposited at a thickness of about 1 to 2 μm by CVD or the like. Through holes formed in the upper cladding 7 were filled with a metal to form the connection conductors 8 and 9 passing through the upper surfaces 5a and 6a of the P-type conductor 5 and the N-type conductor 6 and to further form the electrodes 10 and 11 made of a metal on the upper surface of the upper cladding 7. The length of the rib waveguide was about 3 to 6 mm.

A reverse bias voltage of about 1 V to 5 V was applied to the electrodes 10 and 11, a high-frequency signal including only an AC component was transmitted to any electrode (signal electrode), and the other electrode (GND) was grounded, whereby an optical modulator suitably usable for optical fiber transmission of 10 Gbps to 100 Gbps was constituted.

What is claimed is:
1. An optical waveguide element, comprising:
a rib waveguide which comprises:
  a core comprising a rib portion and a pair of slab portions comprising a first slab portion and a second slab portion connected to both sides of the rib portion so as to sandwich the rib portion, wherein,
  the rib portion comprises a cross-sectional dimension which allows the propagation of a fundamental mode and a higher order mode in a predetermined single polarization state, and comprises a first P-type semiconductor and a first N-type semiconductor forming a PN junction, the first slab portion comprises a second P-type semiconductor and a P-type conductor connected to each other, and the second P-type semiconductor is connected to the first P-type semiconductor of the rib portion, the second slab portion comprises a second N-type semiconductor and an N-type conductor, and the second N-type semiconductor is connected to the first N-type semiconductor of the rib portion, the first and second P-type semiconductors are made of a semiconductor material comprising a P-type dopant, the first and second N-type semiconductors are made of a semiconductor material comprising an N-type dopant, the P-type conductor is made of a semiconductor material comprising a P-type dopant in a higher concentration than the first and second P-type semiconductors, is electrically connected to a first electrode, and is arranged in a region where the higher order mode propagates, and the N-type conductor is made of a semiconductor material comprising an N-type dopant in a higher concentration than the first and second N-type semiconductor, is electrically connected to a second electrode, and is arranged in a region where the higher order mode propagates;

a lower cladding which is arranged between the substrate and the core;

an upper cladding which is arranged in a surrounding of the core, the first and second electrodes being formed on the upper surface of the upper cladding;

connection conductors which electrically connect the first electrode and the P-type conductor, and the second electrode and the N-type conductor, and pass through the upper cladding; and a transition portion formed at an end of the rib waveguide, a width of each of the pair of slab portions increasing continuously from zero; and a rectangular waveguide which comprises a rectangular core portion having the same width and thickness as the rib portion and which is connected to an end of the rib waveguide.

2. The optical waveguide element according to claim 1, wherein all of the semiconductor materials are silicon.

3. The optical waveguide element according to claim 1, wherein the width of the rib portion of the rib waveguide is 500 to 600 nm.

4. The optical waveguide element according to claim 1, wherein a width of each of the pair of slab portions in the transition region changes linearly in a propagation direction of light.

5. The optical waveguide element according to claim 1, wherein a width of each of the pair of slab portions in the transition region changes quadratically in a propagation direction of light.

6. The optical waveguide element according to claim 1, further comprising an inverted tapered waveguide which is connected to an end portion on an opposite side to the connection portion of the rectangular waveguide, and has a narrower width toward a tip thereof.

7. The optical waveguide element according to claim 1, further comprising:

a Mach-Zehnder waveguide which comprises two arm portions between two 1×2 optical branching parts, wherein each of the 1×2 optical branching parts is constituted by a multimode interferometer, each of the two arm portions comprises the rib waveguide, and the rib waveguides and the 1×2 optical branching parts are connected by the rectangular waveguides.

8. The optical waveguide element according to claim 1, wherein an inverted tapered waveguide with a narrower width toward a tip is connected to an end portion of a rectangular waveguide in an end portion in which light is incident on the optical waveguide element or light is emitted from the optical waveguide element.

9. An optical modulator, comprising:

the optical waveguide element according to claim 1, wherein a constant reverse bias voltage is applied to a first electrode connected to the P-type conductor and a second electrode connected to the N-type conductor and an electrical signal only comprising an AC component is transmitted to either the first electrode or the second electrode to perform optical modulation.

* * * * *